(12) United States Patent
Ung et al.

(10) Patent No.: US 6,907,116 B2
(45) Date of Patent: Jun. 14, 2005

(54) TIME BALANCE BASED PREPAID SUBSCRIBER DATABASE AND REPORTING

(75) Inventors: Dara Ung, Odenton, MD (US); Peter He, Clarksville, MD (US)

(73) Assignee: TeleCommunication Systems Inc., Annapolis, MD (US)

(*) Notice: Subject to any disclaimer, the term of this patent is extended or adjusted under 35 U.S.C. 154(b) by 576 days.

(21) Appl. No.: 09/911,828

(22) Filed: Jul. 25, 2001

(65) Prior Publication Data

US 2003/0008635 A1 Jan. 9, 2003

Related U.S. Application Data

(60) Provisional application No. 60/285,990, filed on Apr. 25, 2001.

(51) Int. Cl.[7] .......................................... H04M 15/00
(52) U.S. Cl. .................... 379/114.16; 379/114.2; 379/114.17; 379/114.15; 455/406
(58) Field of Search ................ 379/114.19, 114.2, 379/114.21, 114.16, 114.17, 114.18, 114.02, 114.06, 114.03, 114.1, 114.15, 114.28, 114.29, 126, 121.04, 121.03, 121.02, 121.01, 127.04, 144.01; 455/405, 406, 407, 408, 409

(56) References Cited

U.S. PATENT DOCUMENTS

| | | |
|---|---|---|
| 4,706,275 A | 11/1987 | Kamil |
| 5,068,891 A | 11/1991 | Marshall |
| 5,828,740 A | 10/1998 | Khuc et al. |
| 5,953,398 A | 9/1999 | Hill |
| 6,058,300 A | 5/2000 | Hanson |
| 6,075,982 A | 6/2000 | Donovan et al. |
| 6,101,378 A | 8/2000 | Barabash et al. |
| 6,188,752 B1 | 2/2001 | Lesley |
| 6,208,854 B1 | 3/2001 | Roberts et al. |
| 6,249,573 B1 * | 6/2001 | Hudson .................. 379/114.2 |
| 6,625,439 B2 * | 9/2003 | Laybourn et al. ........... 455/407 |

* cited by examiner

Primary Examiner—Rexford Barnie
(74) Attorney, Agent, or Firm—William H. Bollman (57) ABSTRACT

A time remaining determination module is implemented in a prepaid service to maintain and/or report subscriber account information based on accurately determined time remaining, even in light of replenishments using differing rate plans and/or dollar values. In particular, the inventive approach utilizes a reporting module which accurately accounts for and determines the total minutes remaining in a subscriber's account by accommodating and adjusting for each potentially different rate plan associated with each recharge or replenishment. This enables the service provider not only to accurately report the account balance in terms of time remaining at any convenient time (e.g., during the call process), but also to correctly manage the subscriber account and call duration.

18 Claims, 5 Drawing Sheets

TIME BALANCE BASED PREPAID SUBSCRIBER DATABASE AND REPORTING

This application is related to and claims priority from a co-pending U.S. Provisional Application No. 60/285,990 to Ung et al., entitled "Prepaid First In-First Out Rating", and filed Apr. 25, 2001, the entirety of which is expressly incorporated herein by reference.

BACKGROUND OF THE INVENTION

1. Field of the Invention

The present invention relates generally to wireless carriers, Internet Service Providers (ISPs), and information content delivery services/providers. More particularly, it relates to wireless telecommunications, ANSI-41D Wireless Intelligent Network (WIN) applications, and prepaid applications.

2. Background of Related Art

In recent years, the telecommunication industry has seen an explosive growth both in the particular types of services offered and in the number of service providers. Among the numerous services now being offered, prepaid call service may be one of the fastest growing segments in the telecommunication industry today, particularly in the wireless device sector.

Figure 4:
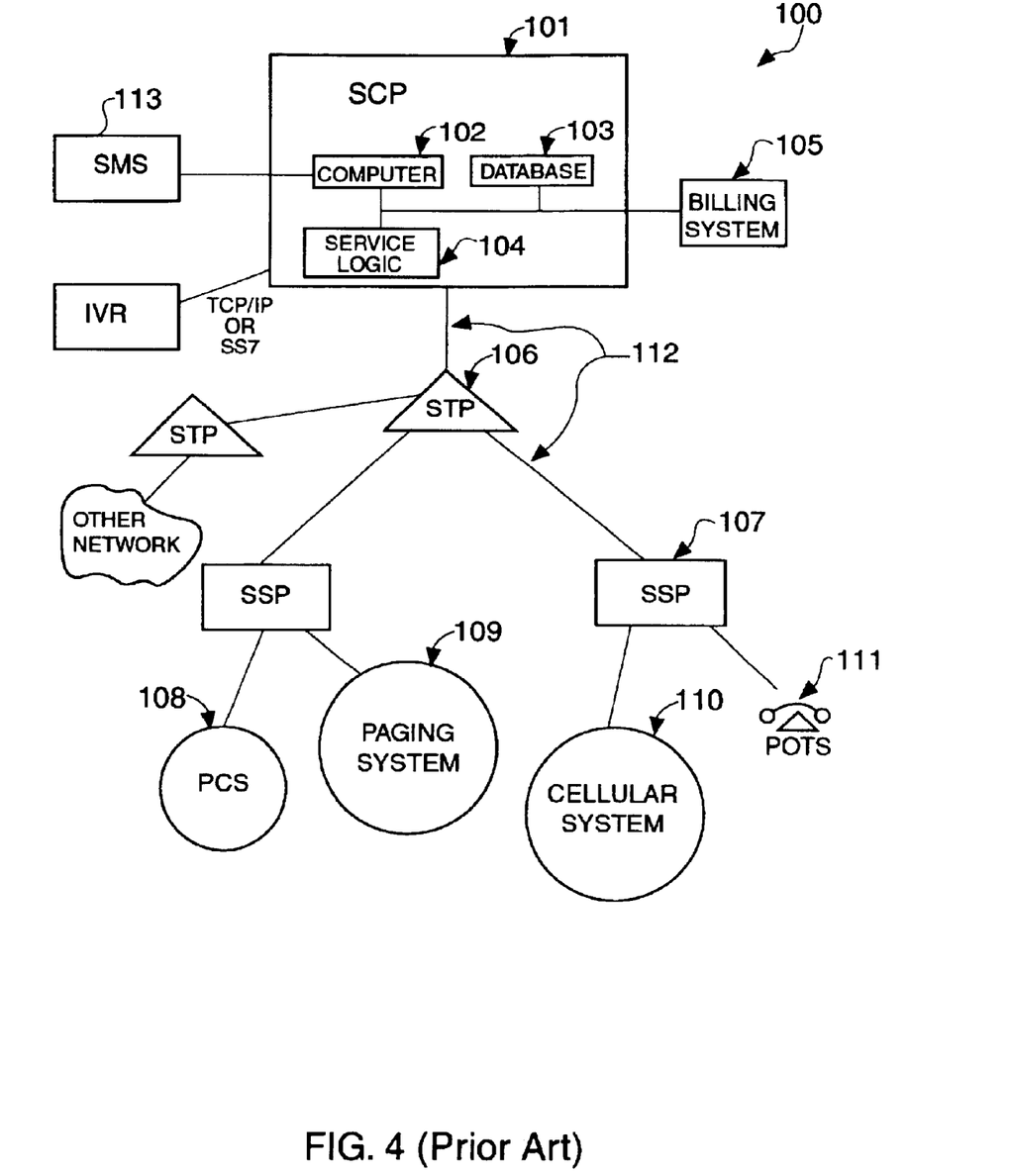
FIG. 4 shows a conventional telecommunication system.

FIG. 4 depicts a simplified telecommunication system 100 including an Advanced Intelligent Network (AIN) associated with wireless services and landline services. Exemplary landline systems include a private branch exchange, public pay phones, or home or business telephones serviced by Plain Old Telephone Service (POTS) 111. Exemplary wireless systems include a Personal Communication Service 108, a paging system 109, or a cellular system 110 or other wireless digital telephone system.

The system elements shown in FIG. 4 are linked via a separate high-speed messaging network called Signaling System 7 (SS7) 112, used to support a variety of special services and advanced call-handling features across multiple vendor domains. Signal Transfer Points (STPs) 106 are tandem packet switches that route SS7 messages among SCPs and SSPs. Switch Service Points (SSPs) 107 are distributed switching nodes that send and receive data from the wireless 110 or landline 111 telecommunication systems for interaction with a Services Control Point (SCP) 101. The SCPs 101 centrally control telephone services provided to subscribers from diversely located switching systems.

An SCP 101 typically includes a computer 102, a database 103, and programmed service logic 104 which manages several system features, including prepaid services. By accessing SCP intelligent nodes, subscribers are able to design and control their own services and customize features without telephone company involvement, provided the feature is offered by the local carrier.

With the advent of the AIN, advantages to the subscribers are numerous. For instance, the service logic 104 can be programmed to implement advanced call handling and service features such as Intelligent Caller Data, Disaster Routing, Intelligent Call Redirection, Intelligent One-Number Calling, Intelligent Call Screening, Automatic Callback, Interactive Voice Response (IVR) or speech recognition, bandwidth on demand in order to support multimedia applications, custom billing and calling card services. The service logic 104 of the AIN can also be programmed to maintain subscriber accounts for prepaid services.

A Service Management System (SMS) 113, linked to the SCP, creates and introduces subscriber services. A billing system 105 is generally linked to the SCP 101. The billing system is generally responsible for tracking and billing subscribers for various services, as well as for providing remaining balance information to prepaid subscribers.

As the name implies, a prepaid call service allows a customer of the service to pay their service provider in advance for the use of their provider's network resources in making a telephone call, e.g., a wireless telephone call. The prepaid call service provides, among other things, an alternative option for a telephone user who might otherwise not be able to obtain the traditional postpaid telephone services because, e.g. of a bad credit rating, or of being in a geographical area where post paid service is unavailable. Also, prepaid call services allow a convenient way for a third party to prepay for a subscriber's subsequent calls (e.g., a parent or guardian prepaying for call services for their child away at college). The world-wide prepaid call services market is projected to grow tremendously in the next few years, encouraging service providers to add or upgrade their own prepaid service offerings to meet the demand.

To implement a prepaid call service for a particular subscriber, that subscriber caller must first deposit a sufficient amount of funds into an appropriate account, e.g., using cash, credit card, debit card and/or other means, to enable the ability to place subsequent telephone calls.

Alternatively, pre-deposited scratch card accounts are readily available for purchase in many convenience stores, providing a simple and direct method for a subscriber to initiate, maintain and/or replenish a prepaid account. Scratch cards may be utilized to repeatedly replenish a particular subscriber's prepaid account, even before a previous replenishment is exhausted. Scratch cards are typically available in varying pre-deposit amounts, e.g., $25, $50, etc. A given value card (e.g., a $30 card) provides a given amount of prepaid call minutes (e.g., 60 minutes) based on a desired call rating.

While scratch cards are convenient, they cause some difficulty to service providers as compared to other replenishment methods (e.g., credit cards, etc.) For instance, each scratch card offer typically provides a different rate plan, and the service provider essentially "switches" to the new rate plan as prior scratch card replenishments become exhausted. As an example, a $30 scratch card might offer a rate plan of $0.50 per minute providing 60 minutes of time, while a $50 scratch card might offer a rate plan of $0.40 per minute providing 125 minutes of time.

Since most service providers offer scratch cards that have different face values and/or rate plans, it is likely that a particular subscriber will replenish their prepaid accounts with scratch cards of differing amounts and/or differing rate plans. Thus, a particular subscriber might have various rate plans "in queue" as their prepaid amounts become used up.

Conventional prepaid services utilize a First-In/First-Out (FIFO) control and billing method to handle switch card replenishments. This conventional FIFO billing and control method typically chronologically stores and manages a list of scratch card face values and associated rate plans for each prepaid subscriber. Usually the rate plan of the next stored replenishment for any particular subscriber will take effect only after depletion of any prior replenishment.

The FIFO control and billing technique can report an accurate dollar amount remaining to a particular subscriber, but can provide only an estimate as to their remaining time. This is because the FIFO control and billing technique calculates the total available minutes provided by the various scratch cards by dividing the total dollar value of all replenishments (e.g., the current and all subsequently loaded scratch cards) by the replenishment rate plan which is currently active (i.e., which is currently being depleted) in dollars per minute.

For example, if a subscriber replenishes with a $25 scratch card providing a rate of $0.35 per minute, then later replenishes with a $50 dollar scratch card providing a rate of $0.25 per minute, the conventional FIFO billing and control approach would divide the total balance of $25+$50=$75 by the current (older) rate plan (e.g., ($75)/($0.35 per minute), resulting in an indication to a subscriber that their remaining prepaid balance is adequate to purchase 214 more minutes. However, the subsequent rate plan is lower than the prior rate plan, and errors and confusion result to the subscriber, who actually has 57 minutes more than the 214 minutes reported to them, i.e., they will actually have 271 minutes remaining once the rate plan changes. Ultimately, this leads to confusion on the part of the subscriber who was notified that only 214 minutes remained.

To avoid this confusion, the service provider has to ensure its subscribers that their available minutes will be recalculated and re-reported after the depletion of the active card balance. Once the final scratch card balance is used, the time remaining will finally be accurately reported. However, if the subscriber has a number of replenishment cards in queue, the current approach may not accurately or correctly track or report the correct total minutes available to the subscriber.

Figure 5:
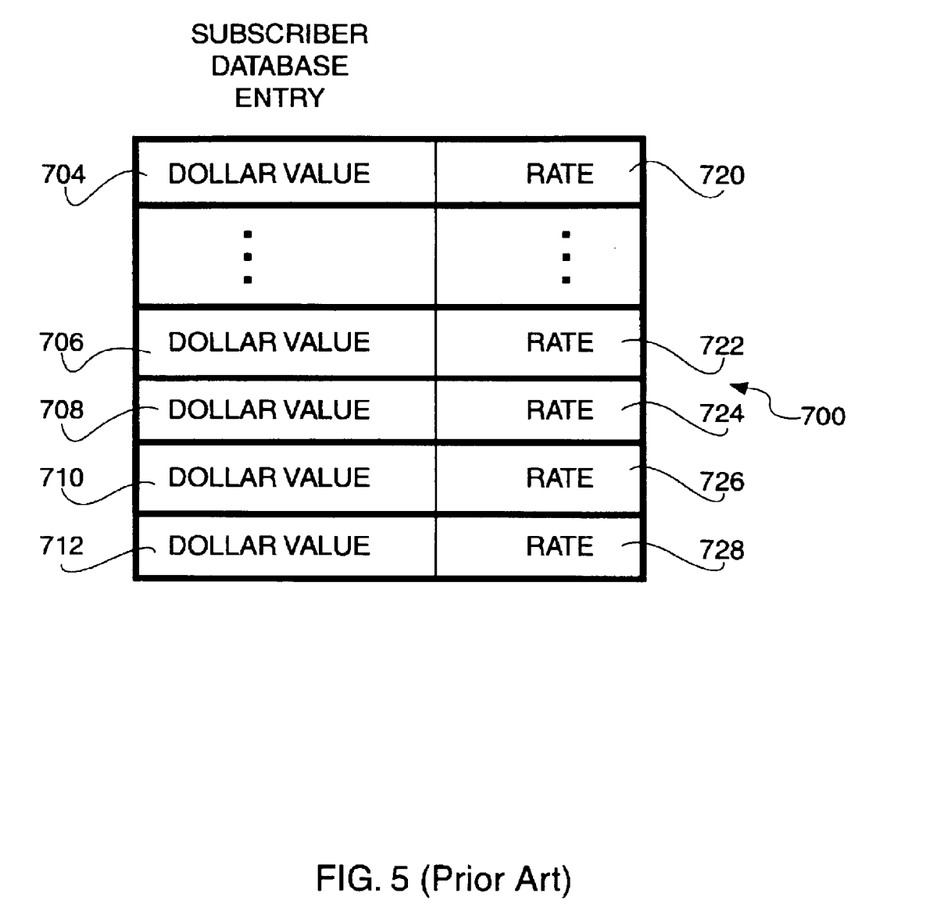
FIG. 5 shows the data elements of a single prepaid subscriber in a conventional subscriber database.

FIG. 5 shows the data elements of a single prepaid subscriber in a conventional subscriber database. As shown in FIG. 5, information must be maintained in the subscriber database 103 for each replenishment. In particular, for a single subscriber, multiple replenishment entries 700 must be maintained if they have not yet been depleted by the subscriber. Each entry includes both the dollar value 704–712 of the various entries, together with the corresponding rate 720–728. This database technique can become quite large, particularly if subscribers tend to have multiple replenishments remaining. Moreover, the technique is boundless for any particular subscriber (unless the service provider limits the number of un-depleted replenishments that a subscriber may store in their prepaid accounts).

Valuable computer processing time and database capacity is conventionally expended to manage and store replenishment data with respect to each subscriber account, which might be better utilized for other purposes, e.g., other services offered by the service provider.

Accordingly, there is a need for a prepay method and apparatus implemented in a telecommunications system that more accurately and efficiently determines and reports the remaining time available for a given prepaid account balance replenished with scratch cards.

SUMMARY OF THE INVENTION

In accordance with the present invention, a subscriber database in a prepaid system comprises a subscriber database entry for a plurality of prepaid subscribers. Each subscriber database entry comprises an amount of time remaining for subscriber use based on a plurality of replenishments having at least two different rate plans.

A method of maintaining subscriber account balance information in a prepaid system in accordance with another aspect of the present invention comprises firstly recording a first replenishment of the subscriber account having a first rate. A second replenishment of the subscriber account having a second rate is recorded. A total dollar amount of the subscriber account is revised, including at least a portion of a dollar value of the first replenishment together with a dollar value of the second replenishment both based on the second rate.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

The present invention provides an improved account balance reporting mechanism for a prepaid service in a communications system, particularly in a wireless telecommunications system.

In particular, the inventive approach utilizes a reporting module which accurately accounts for and determines the total minutes remaining in a subscriber's account by accommodating and adjusting for each potentially different rate plan associated with each recharge or replenishment. This enables the service provider not only to accurately report the account balance in terms of time remaining at any convenient time (e.g., during the call process), but also to correctly manage the subscriber account and call duration.

Figure 1:
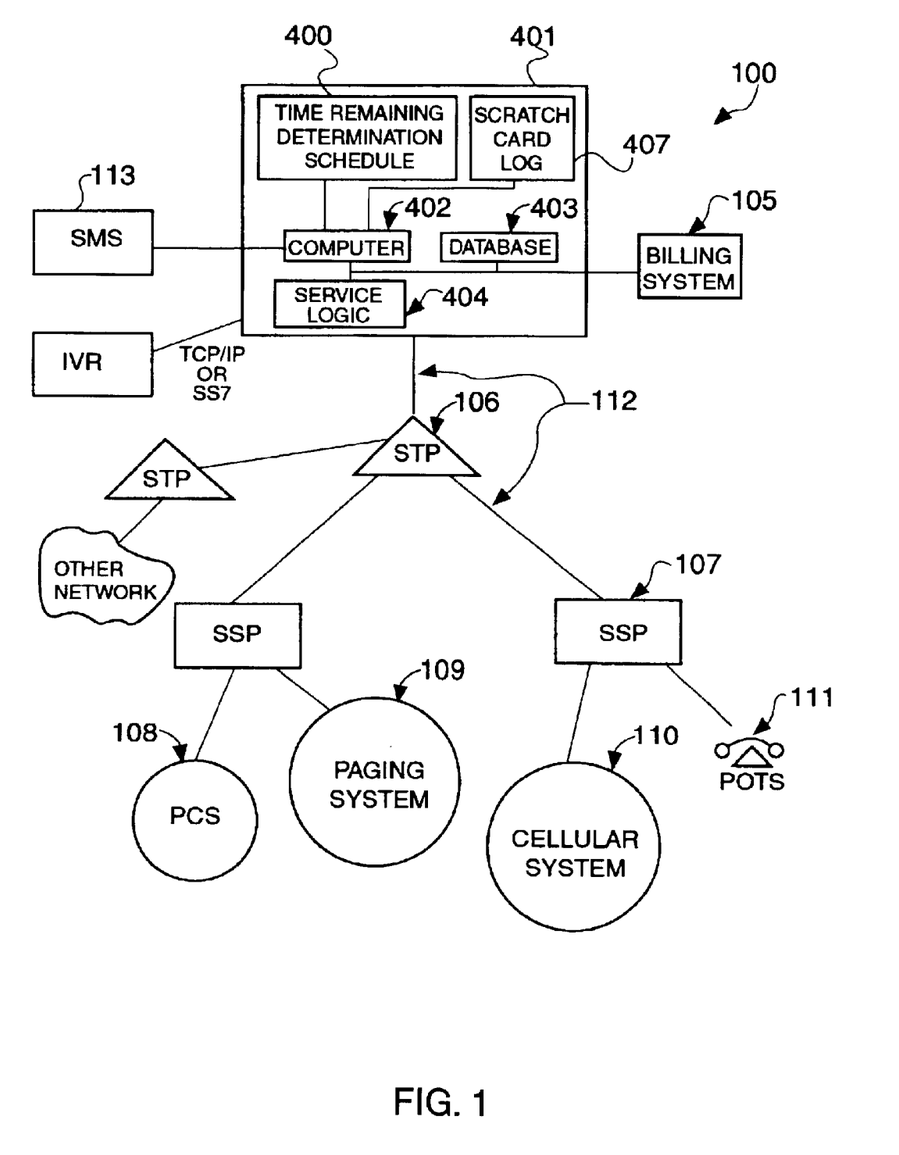
FIG. 1 shows a block diagram of a telecommunication system including a time remaining determination module, in accordance with the principles of the present invention.

FIG. 1 shows a block diagram of a telecommunication system including a time remaining determination module, in accordance with the principles of the present invention.

Figure 3:
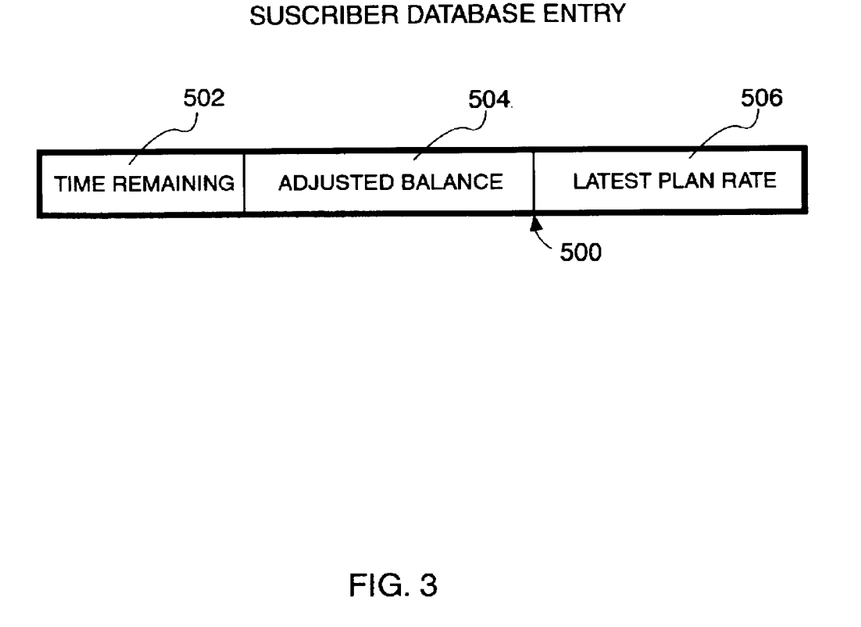
FIG. 3 shows the data elements of an entry of a single prepaid subscriber in a subscriber database in a service provider network including a time remaining determination module, in accordance with the principles of the present invention.

In particular, as shown in FIG. 1, a Switching Control Point 401 includes a time remaining determination module 400 and suitable scratch card replenishment log 407. Suitable service logic 404 is implemented to control the reporting of time remaining to the subscriber's as calculated by the time remaining determination module 400. The remaining elements shown in FIG. 1 are substantially otherwise as shown in FIG. 3 and as generally known in the art.

While shown in FIG. 1 implemented in an SCP 101 of a wireless system, the time remaining determination module 400 may alternatively be implemented in a landline system, e.g., in an individual central office switch of a Public Switched Telephone Network (PSTN).

Figure 2:
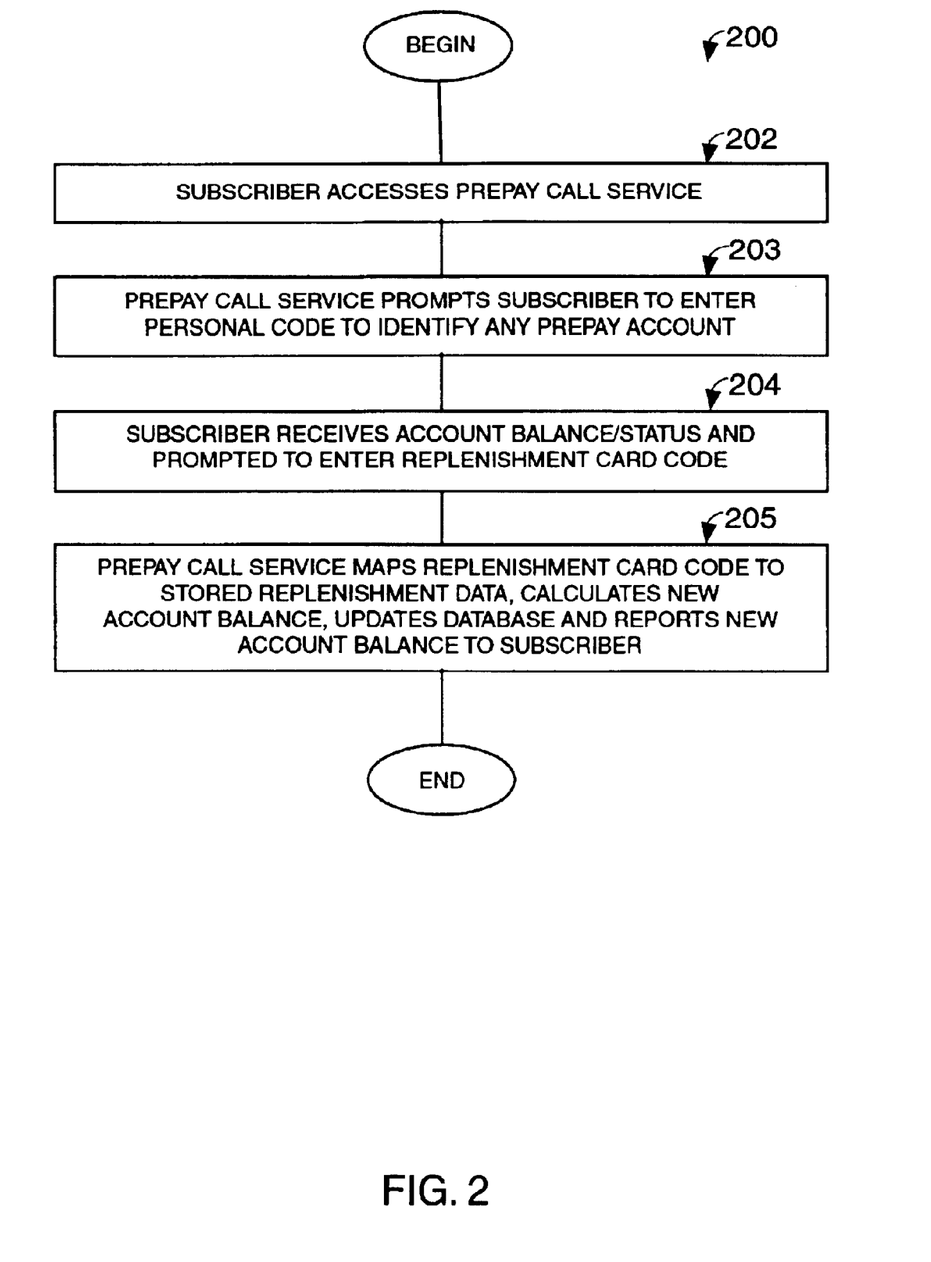
FIG. 2 shows a flow chart of an exemplary process by which the time remaining determination module of FIG. 1 operates.

The service logic 404 and time remaining determination module 400 shown in FIG. 1 are suitably adapted to perform the exemplary process shown in FIG. 2. FIG. 2 shows a flow chart showing exemplary replenishment or account recharge process 200 controlled by the service logic 404 and reported (at least in part) by the time remaining determination module 400.

In step 201 of FIG. 1, a particular subscriber accesses a prepay call service of a particular service providers network

100, e.g., by dialing a telephone number supplied on the replenishment card.

In step 203, the prepay call service may prompt the subscriber to enter a personal code or other password to properly authorize access to their prepay subscriber account. Thus, the subscriber is prompted by an IVR controlled by the SCP 401. Then the subscriber enters their personal code or other password using the dual tone, multi-frequency (DTMF) keypad, or by verbalizing the same if voice recognition capability is provided. The IVR passes the collected information to the SCP service logic 404.

In response, the service logic 404 of the SCP 401 accesses the time remaining determination module 400 to obtain the time remaining balance of a relevant subscriber, as well as other otherwise conventional account information (e.g., dollar balance, account status such as active or closed, etc.) and reports the same to the relevant subscriber. The report may be provided to the relevant subscriber at the relevant wireless device, or at a different remote device (e.g., at a landline telephone).

To provide an accurate measurement of time remaining (particularly in light of the possibility that the account may have been replenished at different rates), the time remaining determination module 400 accesses a scratch card log 401. The scratch card log 401 may maintain information regarding remaining replenishments, e.g., the dollar amount and rate for remaining value in the subscriber's account.

Generally, the subscriber selects a replenishment (scratch) card to replenish their prepaid account selected according to the face value of "$Balance" and associated "Available Minutes". Given the selected card, consider the following equations:

Plan Rate=$Balance/Available minutes or

Available minutes=$Balance/Plan Rate.

Extending these equations to multiple replenishment scenarios, if Rate1=rate of the first replenishment card used, $Balance1=$Balance of the first replenishment card used, Rate2=rate of the second replenishment card used, and $Balance2=Balance of the second replenishment card used, then the total number of minutes purchased may be calculated as:

$$\text{Total Minutes} = \frac{\$Balance1}{Rate1} + \frac{\$Balance2}{Rate2} = \frac{Adjusted\$Balance}{Rate2}$$

The Adjusted$Balance is preferably determined such that the Total Minutes is correctly calculated with most recent replenishment rate (e.g., Rate2). Solving the above equation for Adjusted $Balance, yields:

Adjusted$Balance=Balance1×(Rate2/Rate1)+$Balance2

This formula provides the basis for accurately calculating Total Minutes remaining based on the current stored dollar balance and plan rate in view of a subsequently deposited $Balance and associated plan rate.

For example, suppose a subscriber has a stored account balance of $25 ($Balance) with a rate plan of $0.35 per minute. Thereafter, the subscriber replenishes an additional $50 with a scratch card (replenishment card) bearing a plan rate of $0.25 per minute. Given this scenario, the time remaining determination module 400 re-determines time remaining for the subscriber, preferably substantially at the time of the deposit, Adjusted$Balance=$25×(0.25/0.35)+$50=$67.8571. If desired, the account balance may be preferably rounded in favor of the subscriber, e.g., to $67.86.

Note that the Adjusted$Balance is a value for internal computational purposes for use by the time remaining determination module 400. In a case where there is a fee associated with a subscriber account such as a monthly surcharge, a rate plan change fee, a maintenance fee, etc., the prepaid system preferably debits this fee from the subscriber remaining balance. The Adjusted$balance can be used for such purpose, noting that this would effect (i.e., reduce) the number of minutes available or remaining.

Total Minutes is also recalculated at the time of replenishment by dividing the Adjusted$Balance by the most recent plan rate as follows: Adjusted$Balance/Rate (new)= 271 minutes.

The Total Minutes are stored in the appropriate location (e.g., data entry 502) in the subscriber data entry 500 in the subscriber account database 403, and may be reported to the subscriber in accordance with otherwise conventional methods.

This approach does not require the prepaid service database to store and manage a list of each unused replenishment deposit (e.g., as shown in FIG. 5). Rather, only the Total Minutes remaining 502, the current Adjusted$Balance 504, and most recently deposited rate plan rate 506 need be maintained for each subscriber entry 500, as shown in FIG. 3.

The above calculation can be extended for subsequent replenishments:

Adjusted$Balance(N)=Adjusted$Balance(N−1)×(Rate(N)/rate(N−1)+$Balance(N)

where:

Adjusted$Balance(N−1)=the previously calculated and stored Adjusted$Balance;

$Balance(N)=the most recent replenishment card deposit; and

Rate (N)=the most recent replenishment plan rate deposit.

The following is a set of scenarios useful to further illustrate the operation of the time remaining determination module 400 in accordance with the principles of the present invention.

In particular, consider the following replenishment cards:

Platinum: $60 face value, rate=$0.25 per minute;

Gold: $40 face value, rate=$0.30 per minute;

Silver: $20 face value, rate=$0.35 per minute;

$Balance1=Old balance before replenishment;

$Balance2=Dollar face value of the new replenishment card; and

Adjusted$Balance=internal computational account dollar balance;

| Old Card | New Card | $Balance1 | Rate | $Balance2 | Rate2 | Adjusted $Balance | Total Minutes |
|---|---|---|---|---|---|---|---|
| Platinum | Platinum | 10 | 0.25 | 60 | 0.25 | 70.0 | 280.00 |
| Platinum | Gold | 10 | 0.25 | 40 | 0.30 | 46.0 | 153.33 |
| Platinum | Silver | 0 | 0.25 | 20 | 0.35 | 20.00 | 57.14 |
| Gold | Platinum | 5 | 0.30 | 60 | 0.25 | 64.17 | 256.67 |
| Gold | Gold | 8 | 0.30 | 40 | 0.30 | 48.00 | 160.00 |
| Gold | Silver | 20 | 0.30 | 20 | 0.35 | 43.33 | 123.81 |
| Silver | Platinum | 40 | 0.35 | 60 | 0.25 | 88.57 | 354.29 |

-continued

| Old Card | New Card | $Balance1 | Rate | $Balance2 | Rate2 | Adjusted $Balance | Total Minutes |
|---|---|---|---|---|---|---|---|
| Silver | Gold | 20 | 0.35 | 40 | 0.30 | 57.14 | 190.48 |
| Silver | Silver | 25 | 0.35 | 20 | 0.35 | 45.00 | 128.57 |

At a suitable point in the process, the subscriber may also be prompted to optionally make an additional replenishment by entering the replenishment card code 204 revealed on a new replenishment card.

Given the replenishment card code, the SCP 401 cross references the replenishment card code to the stored replenishment data for authentication.

In step 205, the time remaining determination module 400 of the SCP 401 maps a particular replenishment card code to stored replenishment data, calculates a new account balance including an accurate time remaining for the particular subscriber, taking into account various rate plans of remaining scratch card replenishments. The prepay call service logic 404 may also update the appropriate entry in the subscriber account database 403, and report the accurate time remaining back to the subscriber.

While the described embodiment relates to information flow between the time remaining determination module 400 and the subscriber database 403, the elements of the SCP 401 may intercept and/or assist in particular communication flow. For instance, the service logic 404 may assist or provide information flow between the subscriber database 403 and the time remaining determination module 400.

FIG. 3 shows the data elements 502–506 of an entry 500 of a single prepaid subscriber in a subscriber database in a service provider network including a time remaining determination module, in accordance with the principles of the present invention.

In particular, conventional prepaid management methods required a subscriber account database 403 to store a table of the current as well as each subsequent (unused) replenishment deposit, as described previously with respect to FIG. 5. In contrast, in accordance with another aspect of the present invention, since time remaining is accurately determined by the time remaining determination module, each subscriber's account balance in the subscriber prepaid account database 403 need only maintain an accurate determination of time remaining 502 (i.e., by a time remaining determination module). In the disclosed embodiment, each subscriber's account balance entry also includes an adjustment value 504 for calculation purposes, and the newly deposited plan rate 506.

This database entry form essentially eliminates the need to maintain dollar value and rate information for a plurality of replenishments for any particular subscriber, as in conventional subscriber databases. The use of a database entry 500 in accordance with the principles of the present invention saves a significant amount of database storage area for each subscriber, and when multiplied by the potentially thousands, hundreds of thousands, etc. of possible subscriber's to a particular wireless network, a tremendous amount of savings in database storage requirements is possible.

The present invention allows a service provider to save and limit valuable processing and database resources by accurately managing subscriber account balances using accurately determined time remaining information based on various different rate plan replenishments.

The report of the accurate time remaining information may be reported at any appropriate time, including during a particular telephone call. For instance, the time remaining information may be updated in real time and reported just once, or at various time during a particular telephone call.

The time remaining determination module 400 implemented, e.g., in the SCP 101 updates for calculation purposes an adjustment value based on the various rates possible, and the newly deposited plan rate. The SCP 101 may report the new account balance and/or accurate time remaining to the subscriber at any convenient or otherwise desired time, e.g., at the time the subscriber replenishes their account.

Preferably, the subscriber may adjust, replenish and/or review their prepaid subscriber account at any particular time, e.g., using voice prompts or other suitable notification mechanism.

To keep the subscribers informed of their account balance, the total available minutes (Total Minutes) can be announced on account deposit or on a per call basis, prior to call connection as done today. Optionally, a text message displaying the total number of minutes purchased can also be sent to the subscribers using Short Message Service after each call.

In accordance with the principles of the present invention, a subscriber can be charged correctly and the prepaid service provider suffers no loss of revenue. Moreover, there is no need to store the history of each replenishment within the service database to provide the correct account balance.

While the invention has been described with reference to the exemplary embodiments thereof, those skilled in the art will be able to make various modifications to the described embodiments of the invention without departing from the true spirit and scope of the invention.

What is claimed is:

1. A method of maintaining subscriber account balance information in a prepaid system, said method comprising:

firstly recording a first replenishment of said subscriber account having a first rate;

secondly recording a second replenishment of said subscriber account having a second rate, said second rate being different than said first rate; and revising a total dollar amount of said subscriber account including at least a portion of a dollar value of said first replenishment based on said first rate together with a dollar value of said second replenishment based on said second rate.

2. The method of maintaining subscriber account balance information in a prepaid system according to claim 1, wherein:

said second recording is performed before said first replenishment becomes exhausted in said subscriber account.

3. Apparatus for maintaining subscriber account balance information in a prepaid system, comprising:

means for firstly recording a first replenishment of said subscriber account having a first rate;

means for secondly recording a second replenishment of said subscriber account having a second rate, said second rate being different than said first rate; and means for revising a total dollar amount of said subscriber account including at least a portion of a dollar value of said first replenishment based on said first rate together with a dollar value of said second replenishment based on said second rate.

4. The apparatus for maintaining subscriber account balance information in a prepaid system according to claim 3, wherein:

said means for secondly recording performs said recording before said first replenishment becomes exhausted in said subscriber account.

5. The method of maintaining subscriber account balance information in a prepaid system according to claim 1, further comprising:

reporting a balance of said subscriber account in terms of time remaining.

6. The apparatus for maintaining subscriber account balance information in a prepaid system according to claim 3, further comprising:

means for reporting a balance of said subscriber account in terms of time remaining.

7. A method of reporting subscriber account balance information, said method comprising:

firstly recording a first replenishment of said subscriber account having a first rate;

secondly recording a second replenishment of said subscriber account having a second rate, said second rate being different than said first rate; and revising a total dollar amount of said subscriber account including at least a portion of a dollar value of said first replenishment based on said first rate together with a dollar value of said second replenishment based on said second rate.

8. The method of reporting subscriber account balance information according to claim 7, wherein:

said second recording is performed before said first replenishment becomes exhausted in said subscriber account.

9. The method of reporting subscriber account balance information according to claim 7, further comprising:

reporting a balance of said subscriber account in terms of time remaining.

10. Apparatus for reporting subscriber account balance information, comprising:

means for firstly recording a first replenishment of said subscriber account having a first rate;

means for secondly recording a second replenishment of said subscriber account having a second rate, said second rate being different than said first rate; and means for revising a total dollar amount of said subscriber account including at least a portion of a dollar value of said first replenishment based on said first rate together with a dollar value of said second replenishment based on said second rate.

11. The apparatus for reporting subscriber account balance information according to claim 10, wherein:

said means for secondly recording performs said recording before said first replenishment becomes exhausted in said subscriber account.

12. The apparatus for reporting subscriber account balance information according to claim 10, further comprising:

means for reporting a balance of said subscriber account in terms of time remaining.

13. A method of adjusting a subscriber's account for replenishments or recharges accomplished with potentially different rate plans, said method comprising:

firstly recording a first replenishment of said subscriber account having a first rate;

secondly recording a second replenishment of said subscriber account having a second rate, said second rate being different than said first rate; and revising a total dollar amount of said subscriber account including at least a portion of a dollar value of said first replenishment based on said first rate together with a dollar value of said second replenishment based on said second rate.

14. The method of adjusting a subscriber's account for replenishments or recharges accomplished with potentially different rate plans according to claim 13, wherein:

said second recording is performed before said first replenishment becomes exhausted in said subscriber account.

15. The method of adjusting a subscriber's account for replenishments or recharges accomplished with potentially different rate plans according to claim 13, further comprising:

reporting a balance of said subscriber account in terms of time remaining.

16. Apparatus for adjusting a subscriber's account for replenishments or recharges accomplished with potentially different rate plans, comprising:

means for firstly recording a first replenishment of said subscriber account having a first rate;

means for secondly recording a second replenishment of said subscriber account having a second rate, said second rate being different than said first rate; and means for revising a total dollar amount of said subscriber account including at least a portion of a dollar value of said first replenishment based on said first rate together with a dollar value of said second replenishment based on said second rate.

17. The apparatus for adjusting a subscriber's account for replenishments or recharges accomplished with potentially different rate plans according to claim 16, wherein:

said means for secondly recording performs said recording before said first replenishment becomes exhausted in said subscriber account.

18. The apparatus for adjusting a subscriber's account for replenishments or recharges accomplished with potentially different rate plans according to claim 16, further comprising:

means for reporting a balance of said subscriber account in terms of time remaining.

* * * * *

UNITED STATES PATENT AND TRADEMARK OFFICE
CERTIFICATE OF CORRECTION

PATENT NO. : 6,907,116 B2
APPLICATION NO. : 09/911828
DATED : June 14, 2005
INVENTOR(S) : Ung et al.

It is certified that error appears in the above-identified patent and that said Letters Patent is hereby corrected as shown below:

On the title page insert the following:

Item --(56) References Cited

| | | |
|---|---|---|
| 5,740,534, | 4/1998, | Ayerst et al. |
| 6,266,614, | 7/2001, | Alumbaugh |
| 5,673,306, | 9/1997, | Amadon et al. |
| 6,148,198, | 11/2000, | Anderson et al. |
| 5,579,372, | 11/1996, | Astrom |
| 5,943,399, | 8/1999, | Bannister et al. |
| 6,101,378, | 8/2000, | Barabash et al. |
| 6,148,197, | 11/2000, | Bridges et al. |
| 6,226,529, | 5/2001, | Bruno et al. |
| 5,950,130, | 9/1999, | Coursey |
| 5,974,054, | 10/1999, | Couts et al. |
| 6,122,503, | 9/2000, | Daly |
| 5,802,492, | 9/1998, | DeLorme et al. |
| 6,289,373, | 9/2001, | Dezonno |
| 6,075,982, | 6/2000, | Donovan et al. |
| 5,692,037, | 11/1997, | Friend |
| 6,198,431, | 3/2001, | Gibson |
| 6,199,045, | 3/2001, | Giniger et al. |
| 6,169,891, | 1/2001, | Gorham et al. |
| 6,181,935, | 1/2001, | Gossman et al. |
| 6,317,594, | 11/2001, | Gossman et al. |
| 5,768,509, | 6/1998, | Gunluk |
| 6,223,046, | 4/2001, | Hamill-Keays et al. |
| 6,035,025, | 3/2000, | Hanson |
| 6,058,000, | 5/2000, | Hanson |
| 5,953,398, | 9/1999, | Hill |
| 5,797,094, | 8/1998, | Houde et al. |
| 5,822,700, | 10/1998, | Hult et al. |
| 5,987,323, | 11/1999, | Huotari |
| 4,706,275, | 11/1987, | Kamil |
| 5,828,740, | 10/1998, | Khuc et al. |

UNITED STATES PATENT AND TRADEMARK OFFICE
CERTIFICATE OF CORRECTION

PATENT NO.       : 6,907,116 B2
APPLICATION NO. : 09/911828
DATED            : June 14, 2005
INVENTOR(S)      : Ung et al.

It is certified that error appears in the above-identified patent and that said Letters Patent is hereby corrected as shown below:

| | | |
|---|---|---|
| 5,592,535, | 1/1997,  | Klotz |
| 5,351,235, | 9/1994,  | Lahtinen |
| 5,978,685, | 11/1999, | Laiho |
| 6,188,752, | 2/2001,  | Lesly |
| 6,173,181, | 1/2001,  | Losh |
| 5,797,096, | 8/1998,  | Lupien et al. |
| 5,761,618, | 6/1998,  | Lynch et al. |
| 5,068,891, | 11/1991, | Marshall |
| 6,327,479, | 12/2001, | Mikkola |
| 5,999,811, | 12/1999, | Molne |
| 6,064,875, | 5/2000,  | Morgan |
| 6,249,744, | 6/2001,  | Morita |
| 6,070,067, | 5/2000,  | Nguyen et al. |
| 6,049,710, | 4/2000,  | Nilsson |
| 6,149,353, | 11/2000, | Nilsson |
| 5,774,533, | 6/1998,  | Patel |
| 6,369,913, | 5/2002,  | Perkins, III |
| 6,208,854, | 3/2001,  | Roberts et al. |
| 5,905,736, | 5/1999,  | Rohen et al. |
| 5,628,051, | 5/1997,  | Salin |
| 5,682,600, | 10/1997, | Salin |
| 5,787,357, | 6/1998,  | Salin |
| 5,946,629, | 8/1999,  | Sawyer et al. |
| 5,920,821, | 6/1999,  | Seaholtz et al. |
| 5,767,795, | 6/1998,  | Schaphorst |
| 5,930,701, | 7/1999,  | Skog |
| 5,794,142, | 8/1998,  | Vanttila et al. |
| 5,806,000, | 9/1998,  | Vo et al. |
| 6,122,520, | 9/2000,  | Want et al. |
| 6,249,680, | 6/2001,  | Wax et al. |
| 6,081,508, | 6/2000,  | West et al. |
| 5,946,630, | 8/1999,  | Willars et al. |
| 6,205,330, | 3/2001,  | Winbladh |
| 5,797,091, | 8/1998,  | Clise et al. |
| 5,343,493, | 8/1994,  | Karimullah |

UNITED STATES PATENT AND TRADEMARK OFFICE
CERTIFICATE OF CORRECTION

PATENT NO. : 6,907,116 B2
APPLICATION NO. : 09/911828
DATED : June 14, 2005
INVENTOR(S) : Ung et al.

It is certified that error appears in the above-identified patent and that said Letters Patent is hereby corrected as shown below:

| | | |
|---|---|---|
| 5,479,482, | 12/1995, | Grimes |
| 5,519,403, | 5/1996, | Bickley et al. |
| 5,535,434, | 7/1996, | Siddoway et al. |
| 4,891,638, | 1/1990, | Davis |
| 5,070,329, | 12/1991, | Jasinaki |
| 5,068,656, | 11/1991, | Sutherland |
| 5,119,104, | 6/1992, | Heller |
| 5,177,478, | 1/1993, | Wagai et al. |
| 5,363,425, | 11/1994, | Mufti et al. |
| 5,387,993, | 2/1995, | Heller et al. |
| 5,485,163, | 1/1996, | Singer et al. |
| 5,479,408, | 12/1995, | Will |
| 5,497,149, | 3/1996, | Fast |
| 5,513,243, | 4/1996, | Kage |
| 5,588,009, | 12/1996, | Will |
| 5,604,486, | 2/1997, | Lauro et al. |
| 5,606,313, | 2/1997, | Allen et al. |
| 5,614,890, | 3/1997, | Fox |
| 4,494,119, | 1/1985, | Wimbush |
| 4,651,156, | 3/1987, | Martinez |
| 4,891,650, | 1/1990, | Sheffer |
| 5,014,206, | 5/1991, | Scribner et al. |
| 5,055,851, | 10/1991, | Sheffer |
| 5,208,756, | 5/1993, | Song |
| 5,218,367, | 6/1993, | Sheffer et al. |
| 5,223,844, | 6/1993, | Mansell et al. |
| 5,289,527, | 2/1994, | Tiedemann, Jr. |
| 5,293,642, | 3/1994, | Lo |
| 5,379,451, | 1/1995, | Nakagoshi et al. |
| 5,347,568, | 9/1994, | Moody et al. |
| 5,374,936, | 12/1994, | Feng |
| 5,390,339, | 2/1995, | Bruckert et al. |
| 5,394,158, | 2/1995, | Chia |
| 5,398,190, | 3/1995, | Wortham |
| 5,406,614, | 4/1995, | Hara |

UNITED STATES PATENT AND TRADEMARK OFFICE
CERTIFICATE OF CORRECTION

PATENT NO. : 6,907,116 B2  
APPLICATION NO. : 09/911828  
DATED : June 14, 2005  
INVENTOR(S) : Ung et al.

Page 4 of 5

It is certified that error appears in the above-identified patent and that said Letters Patent is hereby corrected as shown below:

| | | |
|---|---|---|
| 5,423,076, | 6/1995, | Westergreen et al. |
| 5,432,841, | 7/1995, | Rimer |
| 4,952,928, | 8/1990, | Carrol et al. |
| 5,214,789, | 5/1993, | George |
| 5,266,944, | 11/1993, | Carrol et al. |
| 5,325,302, | 6/1994, | Izidon et al. |
| 5,361,212, | 11/1994, | Class et al. |
| 5,381,338, | 1/1995, | Wysocki et al. |
| 5,369,227, | 3/1995, | Carroll et al. |
| 5,418,537, | 5/1995, | Bird |
| 5,434,789, | 7/1995, | Fraker et al. |
| 5,461,390, | 10/1995, | Hoshen |
| 5,470,233, | 11/1995, | Fuchterman et al. |
| 5,485,161, | 1/1996, | Vaughn |
| 5,488,563, | 1/1996, | Chazelle et al. |
| 5,508,931, | 4/1996, | Snider |
| 5,515,287, | 5/1996, | Hakoyama et al. |
| 5,532,690, | 7/1996, | Hertel |
| 5,539,398, | 7/1996, | Hall et al. |
| 5,552,772, | 9/1996, | Janky et al. |
| 5,568,119, | 10/1996, | Schipper et al. |
| 5,574,648, | 11/1996, | Pilley |
| 5,606,850, | 3/1997, | Nakamura |
| 5,610,815, | 3/1997, | Gudat et al. |
| 5,615,116, | 3/1996, | Gudat et al. |
| 5,621,793, | 4/1997, | Bednarak et al. |
| 5,235,630, | 8/1993, | Moodey et al. |
| 5,543,776, | 8/1996, | L'Esperance et al. |
| 5,633,912, | 5/1997, | Tsoi |
| 5,454,024, | 9/1995, | Lebowitz |
| 5,334,974, | 8/1994, | Simms et al. |
| 5,299,132, | 3/1994, | Wortham |
| 5,193,215, | 3/1993, | Olmer |
| 5,144,283, | 9/1992, | Arens et al. |
| 5,555,286, | 9/1996, | Tendler |

UNITED STATES PATENT AND TRADEMARK OFFICE
CERTIFICATE OF CORRECTION

PATENT NO.       : 6,907,116 B2
APPLICATION NO.  : 09/911828
DATED            : June 14, 2005
INVENTOR(S)      : Ung et al.

It is certified that error appears in the above-identified patent and that said Letters Patent is hereby corrected as shown below:

| | | |
|---|---|---|
| 5,388,147, | 2/1995, | Grimes |
| 5,081,667, | 1/1992, | Drori et al. |
| 1,103,073, | 7/1914, | O'Connel |
| 5,043,736, | 8/1991, | Darnell et al. |
| 5,161,180, | 11/1992, | Chavous |
| 5,239,570, | 8/1993, | Koster et al.-- |

Signed and Sealed this

Seventh Day of April, 2009

JOHN DOLL
*Acting Director of the United States Patent and Trademark Office*